No. 874,040. PATENTED DEC. 17, 1907.
E. A. SPERRY.
METHOD FOR DETINNING AND PRODUCING TIN COMPOUNDS AND OTHER PRODUCTS.
APPLICATION FILED NOV. 29, 1905.
2 SHEETS—SHEET 2.
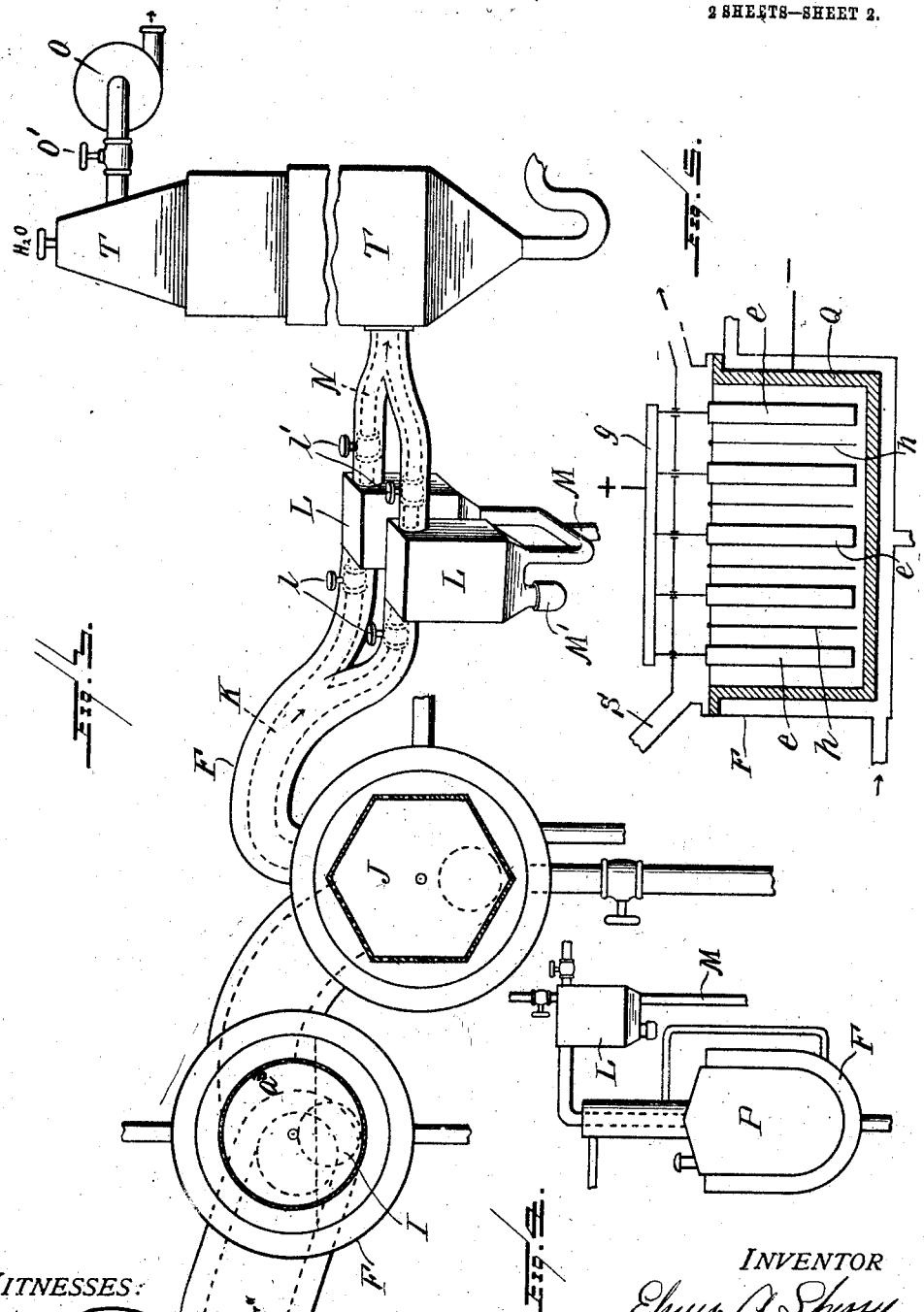
WITNESSES:
INVENTOR
Elmer A. Sperry.
BY
Buckingham & Ewart
Attorneys

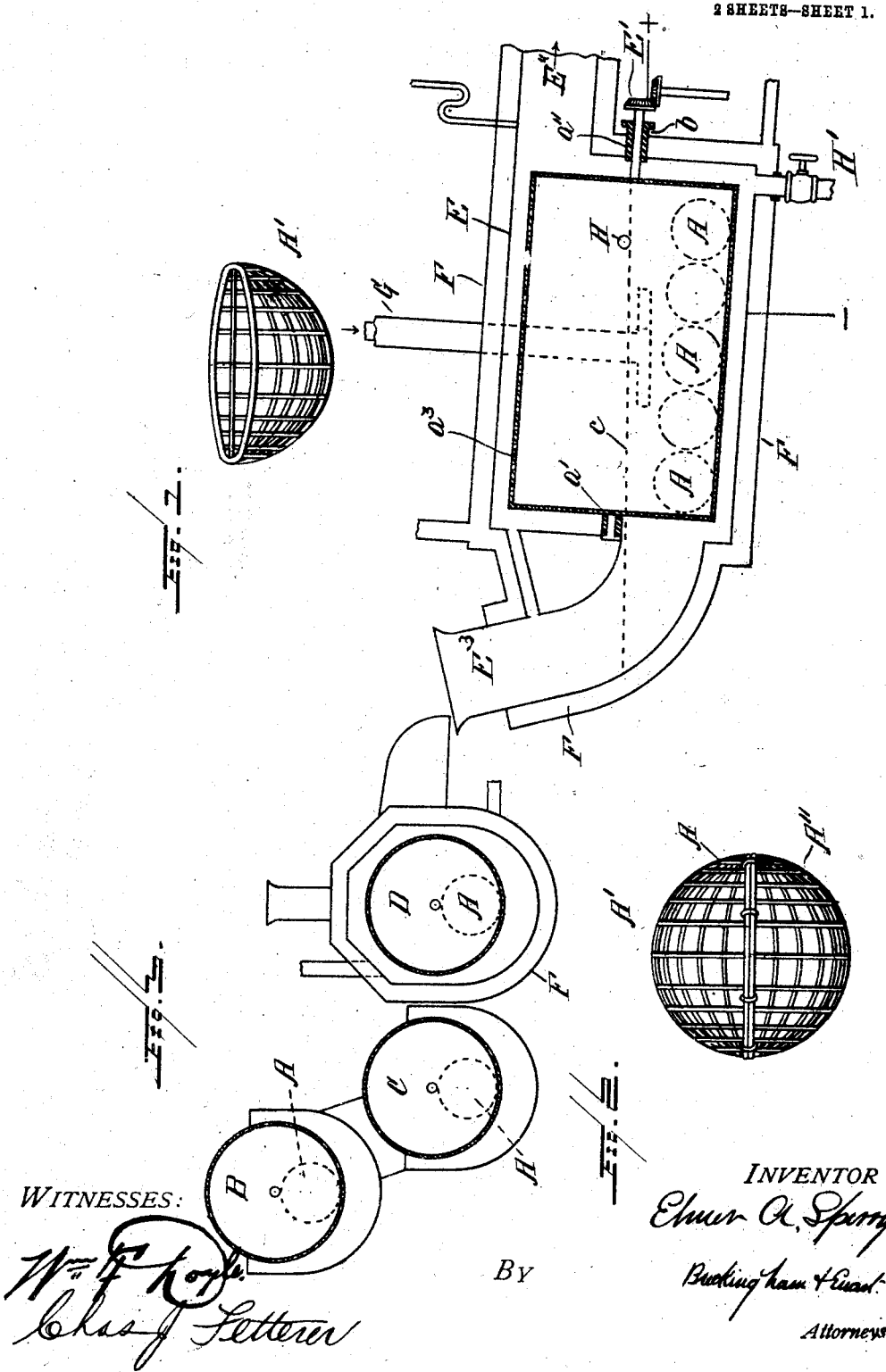

UNITED STATES PATENT OFFICE.

ELMER A. SPERRY, OF NEW YORK, N. Y.

METHOD FOR DETINNING AND PRODUCING TIN COMPOUNDS AND OTHER PRODUCTS.

No. 874,040.     Specification of Letters Patent.     Patented Dec. 17, 1907.

Application filed November 29, 1905. Serial No. 289,581.

*To all whom it may concern:*

Be it known that I, ELMER A. SPERRY, a citizen of the United States, residing at Brooklyn, New York, in the county of Kings and State of New York, have invented new and useful Improvements in Methods for Detinning and Producing Tin Compounds and other Products, of which the following is a specification.

This invention is based on the chemical reaction between chlorin and metallic tin which produces stannic chlorid. Tin or any tin bearing material, such for instance as tin plate scrap may be considered as suitable for the supply of the metal.

The invention consists in a process or method of operation whereby chlorin in any of its reacting forms, including anhydrous chlorin, gaseous chlorin, pure or diluted with moisture or other gases or vapors, or chlorin compounds may be successfully employed in carrying out the process economically, continuously and on a commercial basis. The stannic chlorid immediately resulting from the reaction may be considered as the terminal product, but the invention extends to steps for the treatment and purification of this material whereby the various commercial forms of the chlorid as well as other products, including metallic tin, are produced.

A further object of the invention is to preserve any inert bodies or residues associated with the tin from attack by the reagent employed.

It also consists in the preliminary treatment of the scrap and in various steps of treatment of both scrap and product throughout the operation of the process, all of which are peculiar to my process, being described in full detail herein, and pointed out in the claims attached hereto and forming a part hereof.

The accompanying drawings serve the purpose of illustrating one form of apparatus with which the process may be carried into effect.

In these drawings Figure 1—illustrates a half of a basket. Fig. 2 is two half baskets, assembled into a spherical package adapted to contain tightly compacted tin scrap. Fig. 3 represents a diagrammatic view of suitable means for carrying out the process; this figure is continued on the second sheet. Figs. 4 and 5 are details illustrating parts of the apparatus by means of which the process is carried forward.

Before going into a detailed description of the process, it may be well to explain that in the successful detinning of tin scrap it is necessary not only to recover the tin but to completely strip the scrap of tin and if possible of all other foreign metals, inasmuch as scrap containing more than .04 per cent of foreign metals is unfit for purposes of making steel, and therefore of very little value as there is practically no market for impure scrap. Again the surface of the scrap should be attacked or oxidized as little as possible. Again, the process should be as continuous as practicable, in this manner avoiding unnecessary expense for labor. In attaining these objects I avail myself, among other things, of a discovery which I have made that hydrated stannic chlorid and stannic chlorin solutions, especially when containing chlorin are extremely active in dissolving or separating tin from other metals or from tin bearing materials, such as tin plate, but the solutions of stannic chlorid are extremely corrosive and do not suspend their action when the tin has disappeared from the iron or steel plate but go farther and attack the plate itself. I have discovered, however, that this is not true to any appreciable extent when the attack is made by hydrated stannic chlorid, under seal of anhydrous stannic chlorid or in the presence of the latter, though not necessarily at all times under seal thereof; this contemplates the admission of water less than that required to make solution.

So far as I have been able to ascertain the increase in the activity of both the hydrate and the solutions of stannic chlorid is as follows: Beginning with the hydrate containing three waters of crystallization as increasing amounts of water are added until a point at about fifty to forty degrees on the Baumé scale (for liquids heavier than water) is reached when the activity gradually falls away more and more as additional quantities of water are added to the solution; the activity of the hydrate is also found to increase with the increase of temperature, to rise very rapidly to sixty-five (65) degrees centigrade or thereabouts and after that more gradually until a point of about ninety (90) degrees is reached where it seems to be somewhat more active than at sixty-five (65) degrees. The activity of any of these liquids or combination of liquids is also greatly increased by the agitation, especially in the presence of the incoming chlorin or gases containing chlorin. For the best results it is necessary to control the temperature of the liquid or liquids in which the treatment goes forward. I have also discovered that fused stannic chlorid hydrate constitutes an electrolyte and is suitable in points of electric conductivity and activity for use as such, and I find that by so utilizing this function of the hydrate I am enabled to more completely strip the scrap and free it from foreign metal content than by simple chlorination. The electrolyzation also tends to correct any tendency of the liquids to pass from the stannic to the stannous state. The recovery of tin is also greatly facilitated by utilizing the hydrate as an electrolyte. I thus render a material or combination of materials in liquid state more active than anhydrous stannic chlorid doubly active by use of the electric current, a thing impossible with the anhydrous inasmuch as it is a non-conductor of electricity. I thus develop conditions which are extremely favorable to the complete removal of all foreign material, inasmuch as making the scrap the anode in such a bath helps to remove the last traces of tin, together with some other metals, such for instance, as lead and antimony. The presence of the hydrate again is found extremely advantageous in the practical operation of the process as it avoids the necessity of drying the chlorin, as complete drying is necessary when the anhydrous chlorid is exclusively employed.

In the present process I am enabled to use ordinary wet chlorin even when associated with air or other gases which themselves may bring water into the system, and instead of drying, which is most difficult and expensive with chlorin gas I may under some circumstances inject extra water; and moreover the process goes forward completely under conditions as stated where air or gases are entrained with the chlorin, as provision is made for recovering all values which are taken from the system either as gases or vapors and which may be either entrained, dissolved or taken up by such air or gases; this step in the process forms an essential part thereof.

In the preliminary preparation of the scrap, it may be divided into two classes; cuttings, which is usually from new tin plate, and manufactured scrap, which is for the most part old scrap, such as cans, etc; in some instances no classification is made. The scrap may be put through the process in any form thought desirable, in mass or rammed tightly into retainers, as illustrated herein. The first class is put into the retainers or baskets direct. The second class may have previous treatment before being placed into these baskets. This treatment if used consists first in a rough mechanical classification; then heating for melting solder and weakening joints. Third, while hot, dismembering and opening all joints. The last process being preferably done with such violence as to throw off all solder possible, which is recovered. This scrap may then be placed in half baskets indicated by A' and A", which are then brought together in the form of a sphere as indicated by A, and may be rammed into molds before basketing. The baskets are practically made of steel net or wires meridionally disposed and secured to a circular ring at the joint. The rings are detachably secured to each other. The tin scrap or cuttings are now preferably washed in a bath of caustic alkali in tank B, drained in tank C, and dried in oven D at an elevated temperature, whereupon they are in readiness to join the other baskets A, in the farther steps of the operation and preferably while still heated from the drying process. In nearly all the steps it is designed to handle these spherical containers filled with scrap automatically, and to this end a number of devices may be employed for rolling or otherwise causing motion to be imparted to these spheres in their transit through the various stages of process. One means that may be employed is a device similar to a hollow revolving screen which is slightly inclined from end to end, upon the revolving of which the spheres introduced at one end gradually work their way to the other, after having rotated in practically every plane possible through the double motion thus imparted to the spheres.

The rotation is valuable from the fact that especially in some of the steps of the process, such for instance, as drying and evaporating, the universal motion imparted serves to dump and eject any material which would otherwise be trapped and retained in an angle or corner of the compacted scrap as packed and retained in this state as by the containers A. In this state the agitation or motion is also effective in eliminating any air that may be entrapped or entrained as the hot masses, much hotter in fact than the reaction chamber itself, are introduced therein under seal; the agitation is also very advantageous in aiding the distribution and absorption of the chlorin throughout the anhydrous liquid or liquids present, thus, not only preventing impoverishment, but aiding in maintaining the fullest possible degree of chlorinization of the liquids; the chlorin being present in excess is thus held in suspension and is entrained as well as dissolved. It is only in this state, viz: the state which we may denominate as supersaturation, that the process progresses rapidly and commercially. The distribution and equalization of the temperatures of the detinning masses and the general temperature controlled by aid of the jackets F is also greatly assisted by this same agitation. These revolving screens may be made of iron inasmuch as under the conditions here presented, iron is not attacked by the chemical reagent or in any other manner to an appreciable extent.

After the baskets and scrap are dried and preferably while yet hot, they are introduced from the drier D into the tube E³, which terminates below the surface of liquid c, which is of some height, for the purpose of preventing the egress of fumes contained in the vessel E, in which is a revolving screen a, handling the spheres A, A, A, etc., for the most part below the surface of the chlorid. The revolving of this screen, or part a, also serves to agitate the chlorid, which thus greatly aids in distribution of the chlorin throughout the mass and also in presenting freshly chlorinated liquid to the tinned surfaces.

The rotation may be effected through a wheel E', the shaft coming out through a stuffing box b. The whole is inclosed within a steam or other jacket F, by means of which the temperature of the chlorid c is governed. This jacket may be either heat absorbing as when containing water or heat emitting as when containing steam according to the necessities of the case. By their aid the contents may be held at any temperature required, preferably above the congealing point of the stannic hydrate with 3 or 5 waters of hydration, including considerations such as, primarily, the vigor of the reaction, also size of apparatus, radiating surface, etc. The chlorin or gases containing chlorin which may or may not be commingled with water or water vapors are introduced into tank E, through pipe G and the surplus liquids drawn off through pipes H or H'; the former being at the overflow level of the tank E. The surplus gases are suitably drawn off as by jacketed pipe E" leading to compartment I.

The revolving screen is insulated at its points, a' and a" and stuffing box b, so that as the spheres are revolving in the screen a, an electric current is passed into the screen including the spheres, which thus become anodic, by virtue of the hydrated stannic chlorid present which acts in the capacity of an electrolyte, as described and out on the walls of the tank E, which thus become the cathode. The lead that becomes electrically separated from the scrap falls to the bottom of the tank E, while the tin which tends to attach itself to the cathode or plate thereon is immediately seized upon by the excess chlorin dissolved or otherwise held in the bath and converted together with any stannous chlorid into stannic chlorid.

The farther steps of the process are very simple and consist of suitably ejecting the spheres from the revolving screen a, and through an opening E" leading to the washing compartment I, which is shown as being furnished with another revolving screen a³ where the spheres are washed in an anhydrous liquid preferably anhydrous stannic chlorid and at a temperature which may be somewhat higher than that maintained in the treating bath. This temperature should be above the congealing point of the hydrate and below the boiling point of the stannic chlorid or other washing medium.

From the washing tank I, the spheres A are passed to the chamber J, which is maintained preferably at a temperature of 116 degrees or above, where the scrap is drained, evaporated and dried, and thus freed from the washing liquor together with any stannic chlorid which may still cling to them. It is here where the revolution and universal motion referred to above, through all planes is also advantageous as any pocketed chlorid may escape and be drawn or driven off during this process of evaporation. If any hydrate remains from the washing in anhydrous liquids, it is found to evaporate very rapidly at a suitable temperature. The vapors and gases passing from this chamber especially with the vaporizing anhydrous chlorid present, also the vapors from the washing liquid, are led in jacketed pipes as pipe K, held at a temperature preferably eighty (80) degrees or more, to a condenser or condensers L, where the gases are suddenly cooled and where both the anhydrous liquid or liquids from tank E, I or J together with any hydrated stannic chlorid is recovered in whole or part; the former being led off by pipe N; the latter being caught in receptacle M'. These condensers serve all the tanks, E, I and J, which are connected by the jacketed passages as shown. Any residual gases passing from any of these tanks and through the condensers L, are led in the jacketed pipe N to the tower T, and there treated with a suitable solvent for the vapors or gases passing, as, for instance, when anhydrous chlorid is present water may be employed, in a suitable manner for production of solutions of stannic chlorid.

A plurality of condensers is employed and valves l and l', provided so that one may be shut off and freed of any solids such as crystals and hydrate, while the other is condensing. It will be seen that the function of condenser L is twofold, as previously stated by me in another branch of this art in connection with the production of anhydrous stannic chlorid, namely, that of both condensing and separating hydrated and anhdyrous stannic chlorid one from the other, the crystals remaining upon the walls of the condenser, while the anhydrous trickles down and is removed through pipe M, the hydrate being removed either mechanically or by heating above its melting point whereupon it runs out and is caught in receptacle M'. It will thus be seen that the products are first heated to insure liquefaction of the hydrate, which otherwise is found to deposit and plug the pipes solidly, afterward they are cooled to condense the vapors and also to solidify and thus separate the hydrated from the anhydrous stannic chlorid, as hereinbefore stated.

A suction fan or blower O is shown connected with the tower, which produces the necessary movement of the gases throughout the system, and is practically so adjusted as by using the valve O', that the pressure is almost at equilibrium; with the surrounding atmosphere throughout the system, same being preferably somewhat inhalent or negative to avoid emission of the noisome gases and vapors.

It now remains to explain the treatment of the products, which are hydrated and anhydrous stannic chlorid and solutions thereof. These were associated, as from tank E, are first strained or filtered hot to free them from foreign materials, then allowed to cool and again strained, whereupon the hydrate which has become crystallized at the lower temperature, is separated from the anhydrous. The crystals are then washed or cleansed in any suitable manner. This product is now ready for market, and is known as muriate of tin or butter of tin. The hydrate, the solutions and also the anhydrous stannic chlorid which is found to be loaded with chlorin is now treated for removal of the chlorin and for purposes of further purification the anhydrous may be distilled. When so distilled a still P may be used, from which the vapors may be condensed in an apparatus similar to condenser L. The product of this distillation is then ready for market.

The foregoing heavy chlorids together with the solution of stannic chlorid, coming from the tower, constitute an example of the tin compounds which result from the processes described. It now remains to describe the step by which metallic tin is recovered from the chlorid of tin. By referring to Fig. 5, it will be seen that a vat Q is illustrated as containing certain anodes, e, e, e, etc., which are of the class known as insoluble anodes which are coupled to a common electrical conductor g. The vat Q together with the connected sheets h, h, h, may constitute the cathode and are provided with electrical connections. The vat Q is surrounded by a jacket F or other suitable means whereby its temperature may be controlled or maintained at a suitable point. Into this vat is placed the chlorid resulting from the previous steps of the process or such portion thereof as is to be treated for tin in the metallic state or other products. In this portion of the plant the chlorid and preferably the hydrated stannic or stannous chlorid is electrolyzed, under such conditions that tin is thrown out or deposited upon the cathodes, h, h, h, etc. The deposit thus secured from the cathodes may be stripped from the surfaces thereof or the cathodes themselves may consist of pure metal as in the case of copper refining, in which case the base plate as well as the deposited metal may be melted together and cast into ingots for the market. The chlorin coming off the anode compartment is collected and returned to the system through pipe R. The supply of chlorid may be introduced through pipe S.

It will be noticed that the process described herein is essentially a continuous one.

I do not wish to be limited by the foregoing method of recovery of tin from the chlorids, or other compounds of tin derived from the chlorid. Other methods exist which are purely chemical and may be employed in lieu of the electrical method described, and the invention extends to any method by means of which the tin may be thrown out from the compounds of tin obtained either primarily or as a secondary product from the treatment described and claimed herein.

In the foregoing description of my invention I have set forth the method of operation, together with its various steps. It should be understood that while the steps are described in the order in which they are employed herein to illustrate one system of procedure, yet some may be used without the others, and the steps may be varied as to detail, as circumstances demand, and the invention extends to such use.

I claim:

1. The process of detinning which consists in reacting on the masses to be detinned with chlorin in the presence of stannic chlorid hydrate.

2. The process of detinning which consists in reacting on the masses to be detinned with chlorin dissolved in or carried by stannic chlorid hydrate.

3. The process of detinning which consists in reacting on the mass to be detinned with chlorin in the presence of stannic chlorid hydrate and controlling the temperature.

4. The continuous process of detinning which consists in drying the tin scrap, reacting on same with chlorin in the presence of anhydrous stannic chlorid, continuously supplying the scrap and the chlorin and controlling the temperature of the reaction.

5. The process of detinning which consists in reacting on the masses to be detinned with chlorin and water vapor in the presence of an anhydrous liquid.

6. The process of detinning and producing stannic chlorid which consists in reacting on the masses to be detinned with chlorin in the presence of moisture and controlling the temperature of the reaction.

7. The process of detinning and producing stannic chlorid which consists in reacting on the masses to be detinned with chlorin in the presence of moisture and maintaining a temperature between the vaporizing point of anhydrous and the congealing point of hydrated stannic chlorid.

8. The process of detinning which consists in reacting on the masses to be detinned with chlorin and moisture in the presence of an anhydrous liquid in which the chlorin is dissolved in whole or part.

9. The process of detinning which consists in reacting on the masses to be detinned with chlorin and water vapor in the presence of a suitable anhydrous liquid producing thereby stannic chlorid and stannic chlorid hydrate and maintaining the temperature at or above the congealing point of the hydrate.

10. The process of recovering tin from tin scrap which consists in reacting upon the mass to be detinned with chlorin in the presence of stannic chlorid, stannic chlorid hydrate and electro-depositing tin from the chlorid.

11. The process of recovering tin from tin scrap which consists in reacting upon the mass to be detinned with chlorin in the presence of stannic chlorid hydrate, adding water and then throwing out tin from the chlorid.

12. The process of detinning which consists in treating the mass to be detinned with a suitable anhydrous liquid into which is fed chlorin and moisture.

13. The method of making stannic chlorid from tin plate scrap, tin, or other tin bearing material which consists in reacting on such material with chlorin in the presence of anhydrous stannic chlorid at a temperature below the boiling point of anhydrous stannic chlorid, and maintaining the reaction by supplying gaseous chlorin to the reacting mass.

14. The process of detinning which consists in reacting upon the mass to be detinned with chlorin in the presence of stannic chlorid, driving off the adhering chlorid by distillation and recovering such chlorid.

15. The process of detinning which consists in reacting upon the mass to be detinned with chlorin in the presence of stannic chlorid, washing the detinned mass in a suitable anhydrous liquid and distilling off the liquid from such mass.

16. The process of detinning which consists in reacting upon the mass to be detinned with chlorin in the presence of stannic chlorid, agitating the detinned mass while separating the chlorids therefrom.

17. The process of detinning which consists in reacting upon the mass to be detinned with chlorin in the presence of anhydrous stannic chlorid, an electrolyte and an electric current.

18. The process of detinning which consists in reacting upon the mass to be detinned with chlorin in the presence of anhydrous stannic chlorid, an electrolyte and an electric current under conditions of mechanical agitation.

19. The process of detinning which consists in reacting upon the masses to be detinned with chlorin in the presence of an anhydrous liquid and water in an insufficient quantity to produce a solution.

20. The process of detinning which consists in cleaning and drying the masses to be detinned and then reacting on same with chlorin in the presence of stannic chlorid hydrate.

21. The process of detinning which consists in reacting on the masses to be detinned with chlorin in the presence of stannic chlorid and moisture, producing stannic chlorids, removing the chlorids at an elevated temperature, and separating the anhydrous from the hydrated chlorid.

22. The process of detinning which consists in reacting on the masses to be detinned with chlorin in the presence of stannic chlorid, producing stannic chlorids, separating the anhydrous from the hydrated chlorids, and separating chlorin from the anhydrous product.

23. The process of detinning which consists in reacting with chlorin upon the masses to be detinned in a chamber, heating the products of such reaction as they are removed from the chamber.

24. The process of detinning which consists in reacting with chlorin upon the masses to be detinned in a chamber, controlling the temperature of such chamber, and heating the products of such reaction as they are removed from the chamber.

25. The process of detinning which consists in reacting with chlorin and moisture upon the masses to be detinned, controlling the temperature of such reaction and drawing off the tin bearing products through heated discharge devices.

26. The continuous process of detinning which consists in reacting with chlorin upon moving masses to be detinned in a plurality of chambers under conditions of temperature control of such chambers, and first heating and then cooling the tin-bearing products thus produced for the purposes specified.

27. The process of detinning which consists in reacting on the mass to be detinned constituting an electrode in an electric circuit with moist chlorin in the presence of anhydrous stannic chlorid.

28. The process of detinning which consists in compacting the scrap, heating same, reacting upon the heated mass with chlorin and controlling the temperature of the reaction.

29. The process of detinning which consists in reacting on the masses to be detinned constituting an electrode in an electric circuit with moist chlorin in presence of anhydrous and hydrated stannic chlorid.

30. The process of detinning which consists in compacting the scrap, heating same, reacting upon the heated mass with chlorin and controlling the temperature of the reaction the temperature of the scrap being higher before being introduced than that of the reaction vessel.

31. The process of detinning which consists in reacting upon the masses to be detinned with chlorin in the presence of stannic chlorid, driving off the adhering chlorid by distillation in a current of gas and recovering the chlorid.

32. The process of detinning which consists in reacting upon the masses to be detinned with chlorin in the presence of stannic chlorid, driving off the adhering chlorid by heat and recovering anhydrous and hydrated tin chlorid.

33. The process of detinning which consists in compacting the scrap, reacting upon the compacted mass with chlorin under conditions of mechanical motion or agitation of such mass and controlling the temperature of such reaction.

34. The process of detinning which consists in reacting upon the masses to be detinned with chlorin diluted with air in the presence of stannic chlorid, driving off the adhering chlorid from the mass by heat in the presence of a moving gaseous body consisting of the air entrained with the chlorin and recovering the chlorid therefrom.

35. The process of detinning which consists in reacting upon the mass to be detinned with chlorin and agitating the detinned mass while separating the chlorid therefrom by heat.

36. The process of detinning which consists in reacting on the masses to be detinned with chlorin in the presence of stannic chlorid producing stannic chlorid therefrom with excess of chlorin and removing chlorin from the product.

37. The process of detinning which consists in compacting the scrap, reacting upon the compacted mass with chlorin dissolved and carried by a suitable liquid under conditions of mechanical motion or agitation of such mass together with the liquid and controlling temperature of the reaction.

38. The process of detinning which consists in reacting on the mass to be detinned with chlorin in the presence of stannic chlorid hydrate and a body of anhydrous liquid and controlling the temperature of the reaction.

39. The process of detinning which consists in compacting the scrap, reacting upon the compacted mass with chlorin dissolved and carried by a suitable liquid under conditions of mechanical motion or agitation of such mass together with the liquid itself, controlling temperature of the reaction and maintaining the reaction by feeding chlorin to the reacting mass.

40. The process of detinning which consists in treating the mass to be detinned with a body of anhydrous liquid into which is fed diluted chlorin gas and water vapor.

41. The process of detinning which consists in reacting upon the mass to be detinned with chlorin in the presence of stannic chlorid hydrate, washing the detinned mass in a suitable anhydrous liquid and distilling off the liquid from such mass.

42. The process of detinning which consists in reacting upon the mass to be detinned with chlorin, washing the detinned mass in a suitable anhydrous liquid, and distilling off the liquid from such mass and re-claiming the liquid.

43. The process of detinning which consists in reacting with dissolved gaseous chlorin upon the masses to be detinned in a chamber controlling the temperature of such chamber and heating the products of such reaction as they are removed from the chamber, and then cooling same to condense the vapor.

44. The process of detinning which consists in reacting with gaseous chlorin upon the masses to be detinned in presence of moisture, controlling the temperature of such reaction and drawing off the tin bearing products through heated discharge devices.

45. The continuous process of detinning which consists in reacting with gaseous chlorin dissolved in whole or part in a suitable liquid upon moving masses to be detinned in a plurality of chambers under conditions of temperature control of such chamber.

46. The method of making stannic chlorid from tin plate scrap or tin bearing material which consists in reacting on such material with chlorin in the presence of anhydrous stannic chlorid at a temperature below the vaporizing point of stannic chlorid, maintaining the reaction by supplying gaseous chlorin to the reacting mass, and separating the stannic chlorid from the undissolved material or residue.

In testimony whereof I have hereunto set my hand in presence of two subscribing witnesses.

ELMER A. SPERRY.

Witnesses:
CHAS. J. FETTERER,
EUGENE T. BURGESSER.